(12) United States Patent
Bedford et al.

(10) Patent No.: US 6,568,684 B2
(45) Date of Patent: May 27, 2003

(54) METHOD OF FORMING A SEAL ASSEMBLY AROUND A SHAFT

(75) Inventors: Billy R. Bedford, Peoria, IL (US); Timothy M. Waters, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 41 days.

(21) Appl. No.: 09/849,805

(22) Filed: May 4, 2001

(65) Prior Publication Data

US 2002/0163133 A1 Nov. 7, 2002

(51) Int. Cl.[7] .............................. F16J 15/34; F16J 15/38
(52) U.S. Cl. ...................... 277/306; 277/358; 277/359; 277/370; 277/390
(58) Field of Search .................... 29/407.08, 407.1, 29/450, 451; 277/300, 306, 317, 321, 911, 925, 358, 359, 360, 370, 371, 374–377, 390, 380–382

(56) References Cited

U.S. PATENT DOCUMENTS

| | | | | | |
|---|---|---|---|---|---|
| 3,180,648 A | * | 4/1965 | Kupfert et al. | ............. | 277/382 |
| 3,767,214 A | * | 10/1973 | Kawamura | ................. | 277/358 |
| 3,985,366 A | * | 10/1976 | Plouzek | ....................... | 277/367 |
| 4,077,634 A | * | 3/1978 | Durham | ....................... | 277/382 |
| 4,105,214 A | * | 8/1978 | Schexnayder | ............... | 277/364 |
| 4,613,005 A | * | 9/1986 | Olsson | ........................ | 175/359 |
| 4,722,534 A | * | 2/1988 | Wentworth | ................. | 277/306 |
| 5,448,924 A | * | 9/1995 | Nagai et al. | ................ | 277/321 |
| 5,527,046 A | * | 6/1996 | Bedford | ...................... | 277/381 |
| 6,047,969 A | * | 4/2000 | Hoefft et al. | ............... | 277/370 |
| 6,401,843 B1 | * | 6/2002 | Besson et al. | .............. | 175/359 |

* cited by examiner

Primary Examiner—Anthony Knight
Assistant Examiner—Vishal Patel
(74) Attorney, Agent, or Firm—Maginot, Addison & Moore; Calvin E. Galstetter; William B Heming (57) ABSTRACT

A method of forming a seal assembly around a shaft is disclosed. The method includes (a) urging a first seal member against a second seal member so as to produce a load between a first seal face and a second seal face, (b) measuring the load produced between the first seal face and the second seal face during the urging step, and (c) securing a first support member to the shaft when a predetermined load value between the first seal face and the second seal face is attained so as to fix the relative position between the first seal member and the second seal member such that the predetermined load is substantially maintained between the first seal face and the second seal face. An associated seal assembly geometry is also disclosed.

16 Claims, 8 Drawing Sheets

METHOD OF FORMING A SEAL ASSEMBLY AROUND A SHAFT

TECHNICAL FIELD

This invention relates generally to a method of forming a seal assembly around a shaft, and more particularly to a method of forming a seal assembly around a shaft of a roller assembly of a track type work machine.

BACKGROUND

Track type work machines typically include a track chain disposed around an idler, a drive sprocket, and a number of roller assemblies interposed the drive sprocket and the idler. Each roller assembly includes a seal assembly having a pair of seal members urged together so as to form a sliding seal interface therebetween. The seal interface functions to ensure that debris (e.g. dirt) present in the environment of the work machine does not enter the roller assembly. The seal interface also functions to maintain a lubricant within the roller assembly.

In order for the seal interface to perform the above described functions properly, the seal members should be urged together so as to create a proper load therebetween. For example, if the force utilized to urge the seal members together is too low then the load therebetween could be reduced to the point where the seal interface does not effectively prevent debris from entering the interior of the roller assembly. On the other hand, if the force utilized to urge the seal members together is too great, then the load therebetween could be increased to the point where too much heat is generated at the interface of the two seal members as the roller assembly is utilized. Both of the above described scenarios can cause maintenance problems.

One way of controlling the load generated between the seal members is to fix a support member at a predetermined position on a shaft of the roller assembly. Fixing the support member in the above described manner then urges the seal members together with a force which is partially controlled by the predetermined position on the shaft at which the support member is fixed. However, a problem with this approach is that the load generated between the two seal members can still vary a significant amount due to the cumulative effect of the mechanical tolerances of the various components which make up the seal assembly.

The present invention is directed to overcoming one or more of the problems or disadvantages associated with the prior art.

SUMMARY OF THE INVENTION

In accordance with one embodiment of the present invention there is provided a method of forming a seal assembly around a shaft. The seal assembly has a first support member, a first seal member having a first seal face, a second seal member having a second seal face, and a second support member. The first support member, the first seal member, the second seal member, and the second support member are all disposed around the shaft such that the first seal member and the second seal member are (i) interposed the first support member and the second support member and (ii) the first seal face is in contact with the second seal face. The method includes (a) urging the first seal member against the second seal member so as to produce a load between the first seal face and the second seal face, (b) measuring the load produced between the first seal face and the second seal face during the urging step, and (c) securing the first support member to the shaft when a predetermined load value between the first seal face and the second seal face is attained so as to fix the relative position between the first seal member and the second seal member such that the predetermined load is substantially maintained between the first seal face and the second seal face.

In accordance with another embodiment of the present invention there is provided a method of forming a seal assembly around a shaft. The seal assembly has a first support member, a first seal member having a first seal face, a second seal member having a second seal face, and a second support member. The method includes (a) positioning the first support member, the first seal member, the second seal member, and the second support member in a fixture such that the first seal member and the second seal member are interposed the first support member and the second support member, (b) positioning a first ram in contact with the first support member, (c) moving the first support member a distance $D_1$ relative to the second support member so as to cause the first seal member to be urged against the second seal member such that a load is produced between the first seal face and the second seal face, (d) locating (i) a second ram in contact with the first support member and (ii) a third ram in contact with the second support member, (e) fixing the relative position between the second ram and the third ram such that an end of the second ram is spaced apart from an end of the third ram by a distance $D_2$ which is substantially equal to the distance $D_1$, (f) positioning the first support member, the first seal member, the second seal member, and the second support member relative to the shaft so that (i) the first support member, the first seal member, the second seal member, and the second support member are disposed around the shaft and (ii) the first seal member and the second seal member are interposed the first support member and the second support member, (g) placing the fixed second and third rams relative to the shaft, the first support member, and the second support member so that (i) the second ram is in an opposing relationship with a wall segment of the first support member and (ii) the third ram is in an opposing relationship with a wall segment of the second support member, and (h) advancing the fixed second and third rams along a longitudinal axis of the shaft so that (i) the third ram contacts the wall segment of the second support member, (ii) the second ram contacts the wall segment of the first support member, and (iii) the second ram moves the first support member relative to the second support member a distance $D_3$. The distance $D_3$ is substantially equal to the distance $D_1$ and the distance $D_2$.

In accordance with yet another embodiment of the present invention there is provided a method of manufacturing a work machine which includes a roller assembly having (i) a rim with a receptacle and a passageway defined therein and (ii) a shaft positioned within the passageway. The method includes (a) positioning a first support member, a first seal member, a second seal member, and a second support member in a fixture such that the first seal member and the second seal member are interposed the first support member and the second support member, (b) positioning a first ram in contact with the first support member, (c) moving the first support member a distance $D_1$ relative to the second support member with the first ram so as to cause the first seal member to be urged against the second seal member such that a load is produced between a first seal face defined on the first seal member and a second seal face defined on the second seal member, (d) locating (i) a second ram in contact with the first support member and (ii) a third ram in contact with the second support member, (e) fixing the relative position between the second ram and the third ram such that an end of the second ram is spaced apart from an end of the third ram by a distance $D_2$ which is substantially equal to the distance $D_1$, (f) positioning the first support member, the first seal member, the second seal member, and the second support member relative to the shaft so that (i) the first support member, the first seal member, the second seal member, and the second support member are disposed around the shaft and located within the receptacle and (ii) the first seal member and the second seal member are interposed the first support member and the second support member, (g) placing the fixed second and third rams relative to the first support member, and the second support member so that (i) the second ram is in an opposing relationship with a wall segment of the first support member and (ii) the third ram is in an opposing relationship with a wall segment of the second support member, and (h) advancing the fixed second and third rams along a longitudinal axis of the shaft so that (i) the third ram contacts the wall segment of the second support member, (ii) the second ram contacts the wall segment of the first support member, and (iii) the second ram moves the first support member relative to the second support member a distance $D_3$. The distance $D_3$ is substantially equal to the distance $D_1$ and the distance $D_2$.

DETAILED DESCRIPTION

Figure 1:
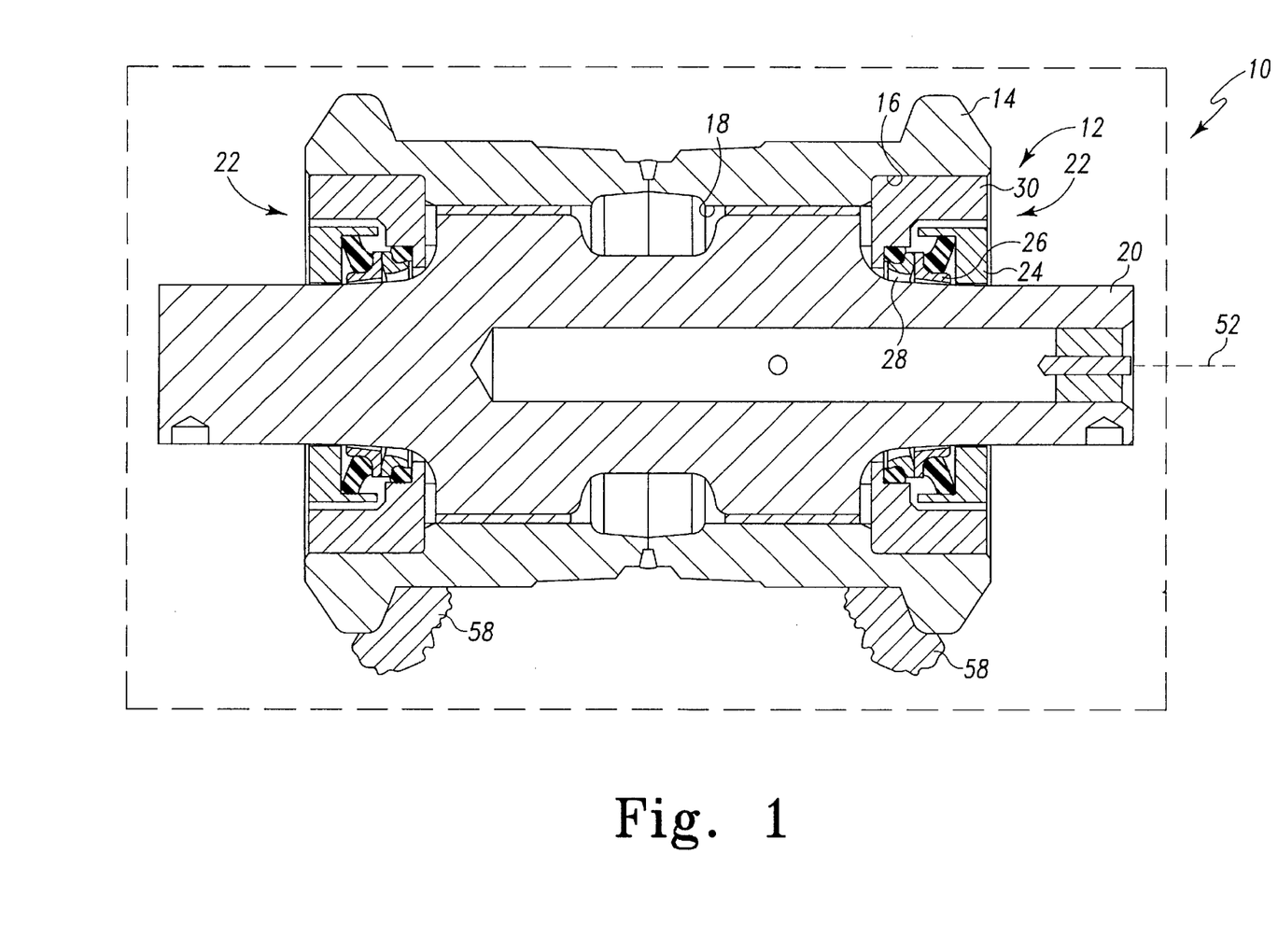
FIG. 1 is a schematic representation of an exemplary work machine which incorporates the features of the present invention therein (note that a cross sectional view of a roller assembly of the work machine is shown for clarity of description)

Referring now to FIG. 1 there is shown a work machine 10 which incorporates the features of the present invention therein. Work machine 10 includes a roller assembly 12 positioned in contact with track links 58. Roller assembly 12 includes a rim 14, a shaft 20, and a pair of seal assemblies 22. Both seal assemblies 22 are substantially identical and therefore only one seal assembly 22 will be described in detail herein.

Figure 5A:
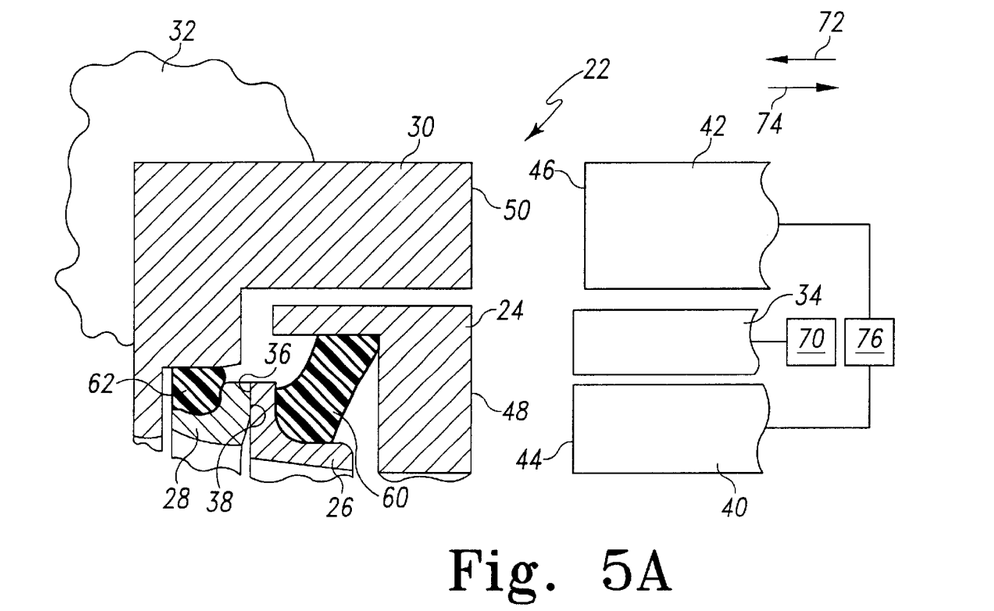
FIG. 5A is a fragmentary view of a first support member, a first seal member, a second seal member, and a second support member of the roller assembly of FIG. 1 positioned in a fixture with a first ram, a second ram, and a third ram positioned adjacent thereto.

Rim 14 has a passageway 18 defined therethrough. Rim 14 also has a receptacle 16 defined therein which is in communication with passageway 18. As shown in FIG. 5D, receptacle 16 is defined by an annular end wall surface 54 and a circumferentially extending wall surface 56. Now referring back to FIG. 1, shaft 20 is positioned within passageway 18 such that shaft 20 extends through receptacle 16. Moreover, shaft 20 is positioned within passageway 18 so that rim 14 can rotate around a longitudinal axis 52 of shaft 20.

Figure 2:
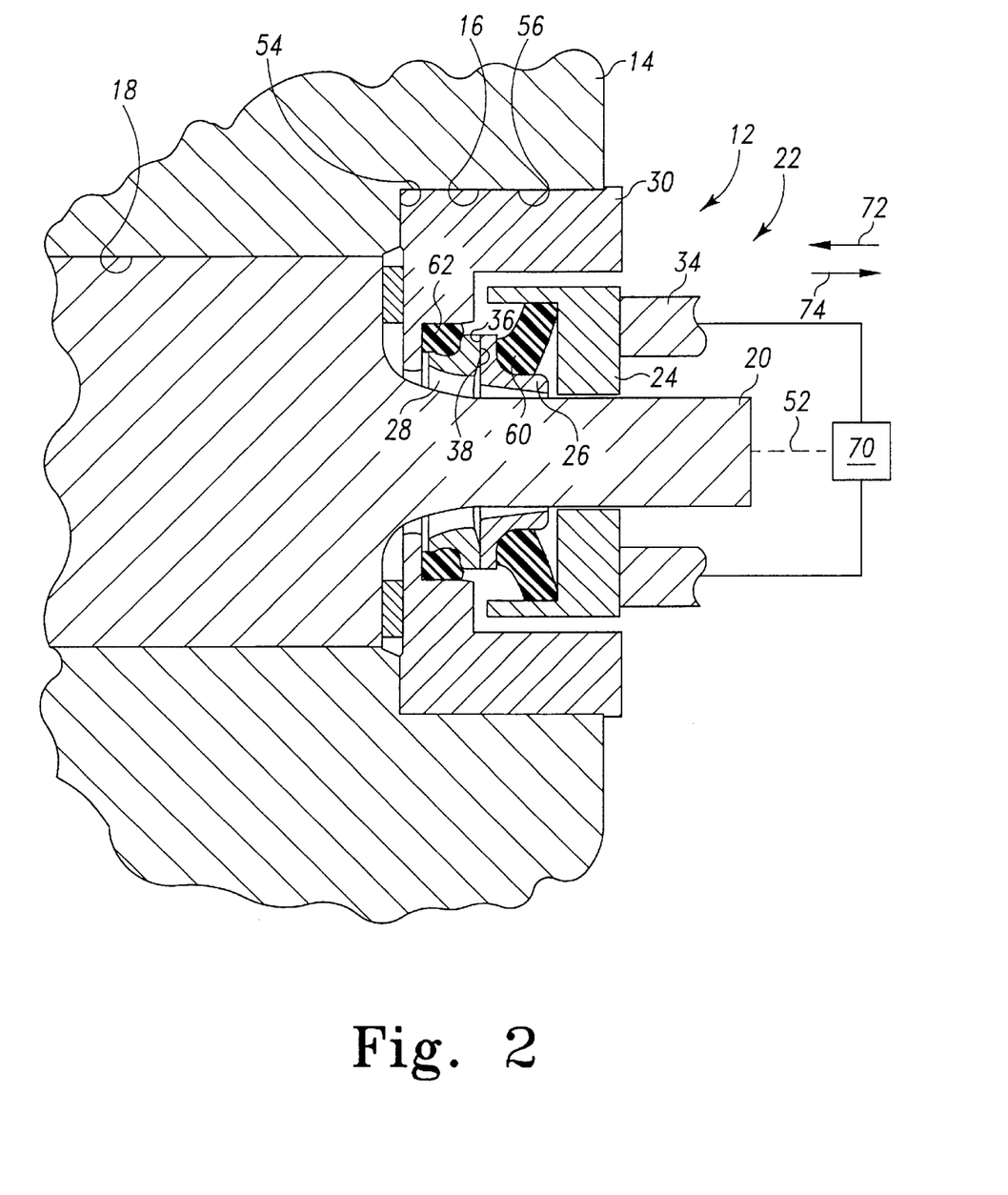
FIG. 2 is a fragmentary view of the roller assembly shown in FIG. 1 with a ram positioned in contact with a support member of a seal assembly of the roller assembly.

As shown more clearly in FIG. 2, seal assembly 22 includes a support member 24, a support member 30, a seal member 26, a seal member 28, and load members 60 and 62. It should be understood that all of the previously mentioned components of seal assembly 22 have a generally annular shape which surrounds shaft 20 when seal assembly 22 is assembled.

One method of assembling or forming seal assembly 22 which incorporates the features of the present invention therein includes positioning support member 30 in receptacle 16 so that support member 30 contacts annular end wall surface 54 and circumferentially extending wall surface 56. Seal member 28 and load member 62 are also positioned within receptacle 16 so that load member 62 is interposed and in contact with support member 30 and seal member 28. Seal member 26 is positioned within receptacle 16 so that a seal face 36 defined on seal member 26 is in contact with a seal face 38 defined on seal member 28. Load member 60 and support member 24 are located within receptacle 16 so that load member 60 is interposed and in contact with support member 24 and seal member 26. Positioning the aforementioned components of seal assembly 22 in the above described manner interposes seal member 26 and seal member 28 between support member 24 and support member 30. In addition, it should be appreciated that load member 60 is positioned in contact with both support member 24 and seal member 26 so that any force exerted on support member 24 is communicated to seal member 26 via load member 60.

Still referring to FIG. 2, a ram 34 is positioned in contact with support member 24. Furthermore, as schematically shown in FIG. 2, ram 34 is mechanically coupled to a mechanism 70 which (i) moves or urges ram 34 in the directions indicated by arrows 72 and 74 and (ii) measures the force with which ram 34 (and therefore support member 24) is urged in the direction indicated by arrow 72. For example, one mechanism ram 34 can be mechanically coupled to is a load cell. Note that ram 34 can possess any physical configuration appropriate to properly move or urge support member 24 in the direction indicated by arrow 72 so that, as discussed in greater detail below, a predetermined load value is attained between seal face 36 and seal face 38.

Mechanism 70 moves or urges support member 24 relative to shaft 20 along longitudinal axis 52 in the direction indicated by arrow 72 so that load member 60 and seal member 26 are also moved or urged in the direction indicated by arrow 72. Moving or urging seal member 26 in the direction indicated by arrow 72 results in seal member 26 being urged against seal member 28 so as to produce a load between seal face 36 and seal face 38. The aforementioned load produced between seal face 36 and seal face 38 is measured. For example, as previously mentioned, the load produced between seal face 36 and seal face 38 can be measured by mechanism 70 since this load will be directly proportional to the force utilized to urge ram 34 in the direction indicated by arrow 72. Preferably, the load between seal face 36 and seal face 38 is measured while ram 34 is urging support member 24 in the direction indicated by arrow 72. Once a predetermined load value between seal face 36 and seal face 38 is attained, support member 24 is secured to shaft 20. It should be understood that the predetermined load utilized herein between seal face 36 and seal face 38 should have a magnitude great enough to prevent debris from entering passageway 18, but should not have a magnitude so great that excessive heat is generated at the interface of seal face 36 and seal face 38 during the use of roller assembly 12. Securing support member 24 to shaft 20 fixes the relative position between seal member 26 and seal member 28 such that the predetermined load is substantially maintained between seal face 36 and seal face 38.

After securing support member 24 to shaft 20, mechanism 70 moves ram 34 in the direction indicated by arrow 74 so that ram 34 is no longer in contact with support member 24, and therefore no longer urging support member 24 in the direction indicated by arrow 72. However, as previously mentioned, since support member 24 is secured to shaft 20 thereby fixing the relative position between seal member 26 and seal member 28, the predetermined load between seal face 36 and seal face 38 is substantially maintained even though ram 34 is no longer in contact with support member 24, and therefore no longer urging support member 24 in the direction indicated by arrow 72.

It should be appreciated that support member 24 can be secured to shaft 20 in any appropriate manner. For example, support member 24 can be secured to shaft 20 by laser welding or tack welding. If tack welding is utilized then it is preferable that the interface between support member 24 and shaft 20 be sealed with an epoxy resin or any other appropriate compound.

Figure 3:
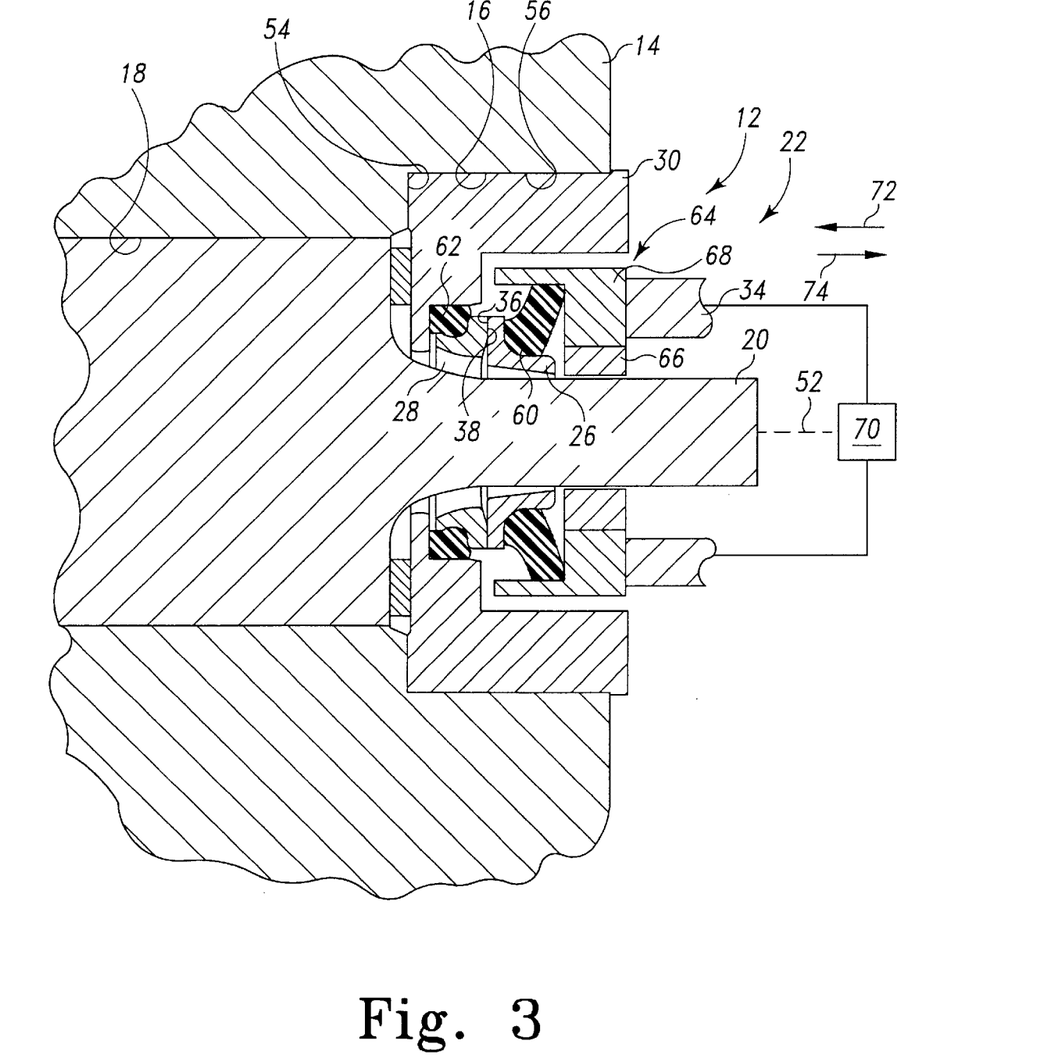
FIG. 3 is a view similar to FIG. 2, but showing an alternative embodiment of the support member.
Figure 4:
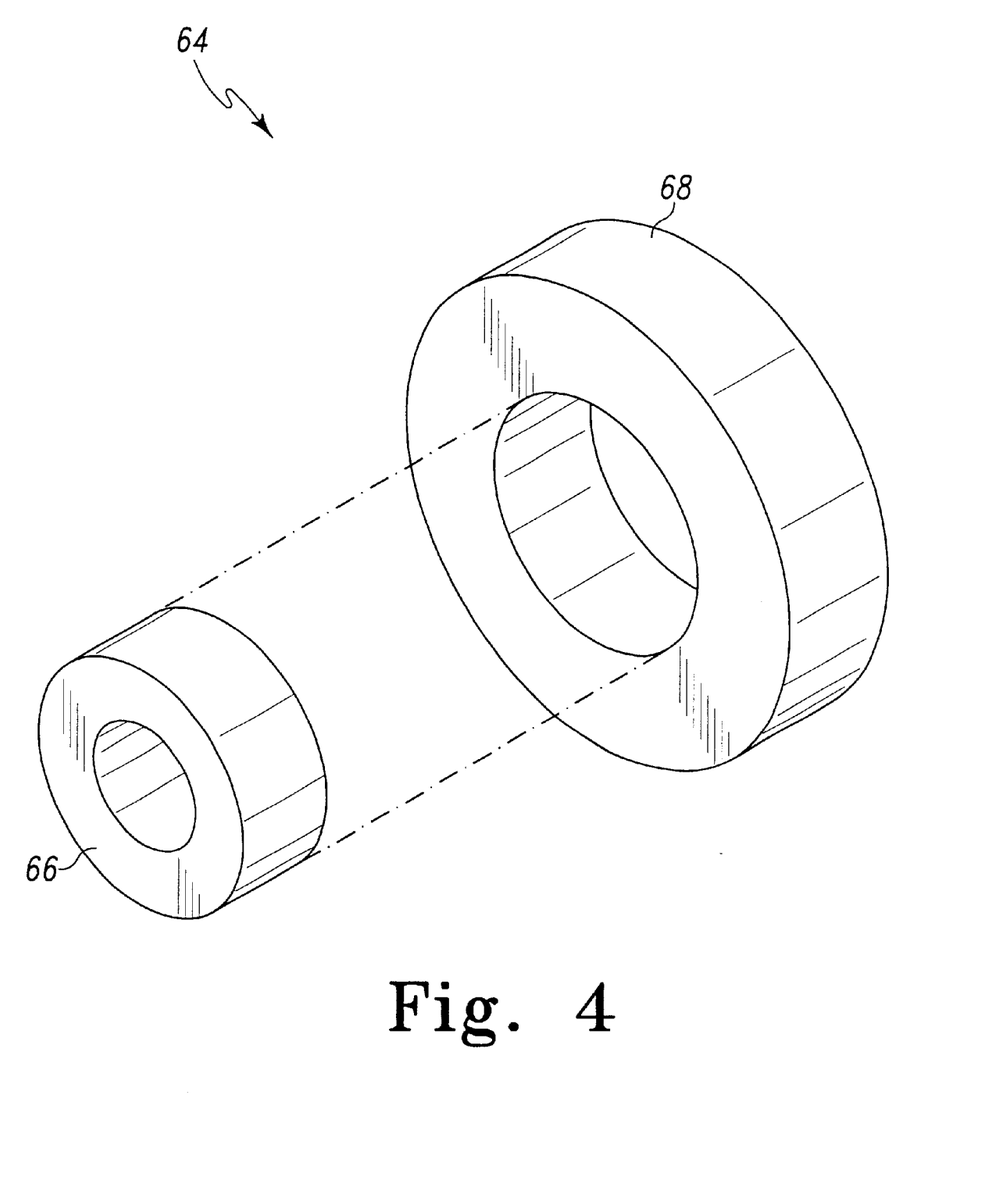
FIG. 4 shows yet another embodiment of the support member.

Another method of assembling or forming seal assembly 22 which incorporates the features of the present invention therein is similar to the above described method with the exception that a support member 64 is utilized in seal assembly 22 rather than support member 24. As shown in FIG. 4, support member 64 includes a ring member 66 and a ring member 68. As shown in FIG. 3, seal assembly 22 is assembled in a substantially identical manner as that described above in reference to FIG. 2. However, instead of disposing support member 24 around shaft 20, ring member 66 of support member 64 is disposed around, and press fit onto, shaft 20 so that ring member 66 is unable to move relative to shaft 20. Ring member 68 of support member 64 is then disposed around shaft 20 and ring member 66 (see FIG. 3). It should be understood that ring member 68 can move relative to shaft 20 and ring member 66 in the directions indicated by arrows 72 and 74. Ring member 68 is also positioned in contact with load member 60 so that, like support member 24, any force exerted on ring member 68 is communicated to seal member 26 via load member 60.

Still referring to FIG. 3, ram 34 is positioned in contact with ring member 68. Mechanism 70 moves ring member 68 relative to shaft 20 along longitudinal axis 52 in the direction indicated by arrow 72 so that load member 60 and seal member 26 are also moved or urged in the direction indicated by arrow 72. As previously discussed, moving or urging seal member 26 in the direction indicated by arrow 72 results in seal member 26 being urged against seal member 28 so as to produce a load between seal face 36 and seal face 38. The aforementioned load produced between seal face 36 and seal face 38 is measured as discussed above. Once a predetermined load value between seal face 36 and seal face 38 is attained ring member 68 is secured to ring member 66. Securing ring member 68 to ring member 66 fixes the relative position between seal member 26 and seal member 28 such that the predetermined load is substantially maintained between seal face 36 and seal face 38.

After securing ring member 68 to ring member 66, mechanism 70 moves ram 34 in the direction indicated by arrow 74 so that ram 34 is no longer in contact with ring member 68, and therefore no longer urging ring member 68 in the direction indicated by arrow 72. However, as previously mentioned, since ring member 68 is secured to ring member 66, and ring member 66 is press fit onto shaft 20, the relative position between seal member 26 and seal member 28 is fixed so that the predetermined load between seal face 36 and seal face 38 is substantially maintained even though ram 34 is no longer in contact with ring member 68, and therefore no longer urging ring member 68 in the direction indicated by arrow 72.

Ring member 68 can be secured to ring member 66 in any appropriate manner such as laser welding or tack welding. As previously mentioned, if tack welding is utilized then it is preferable that the interface between ring member 68 and ring member 66 be sealed with an epoxy resin or any other appropriate compound.

Yet another method of assembling or forming seal assembly 22 which incorporates the features of the present invention therein includes positioning support member 24, load member 60, seal member 26, seal member 28, load member 62, and support member 30 in a fixture 32 in the same arrangement these components are positioned within receptacle 16. In particular, as shown in FIG. 5A, the components of seal assembly 22 are positioned in fixture 32 so that (i) load member 60 is interposed and in contact with support member 24 and seal member 26, (ii) seal face 36 of seal member 26 is in contact with seal face 38 of seal member 28, (iii) load member 62 is interposed and in contact with support member 30 and seal member 28, and (iv) seal member 26 and seal member 28 are both interposed support member 24 and support member 30. Ram 34 and a ram 40 are both positioned in an opposing relationship with a wall segment 48 of support member 24. A ram 42 is positioned in an opposing relationship with a wall segment 50 of support member 30. It should be appreciated that, as discussed above, ram 34 is mechanically coupled to mechanism 70. Moreover, as schematically shown in FIGS. 5A–5F, rams 40 and 42 are mechanically coupled to a mechanism 76 which moves or urges rams 40 and 42 in the directions indicated by arrows 72 and 74. For example, one mechanism rams 40 and 42 can be mechanically coupled to is a hydraulic press.

Figure 5B:
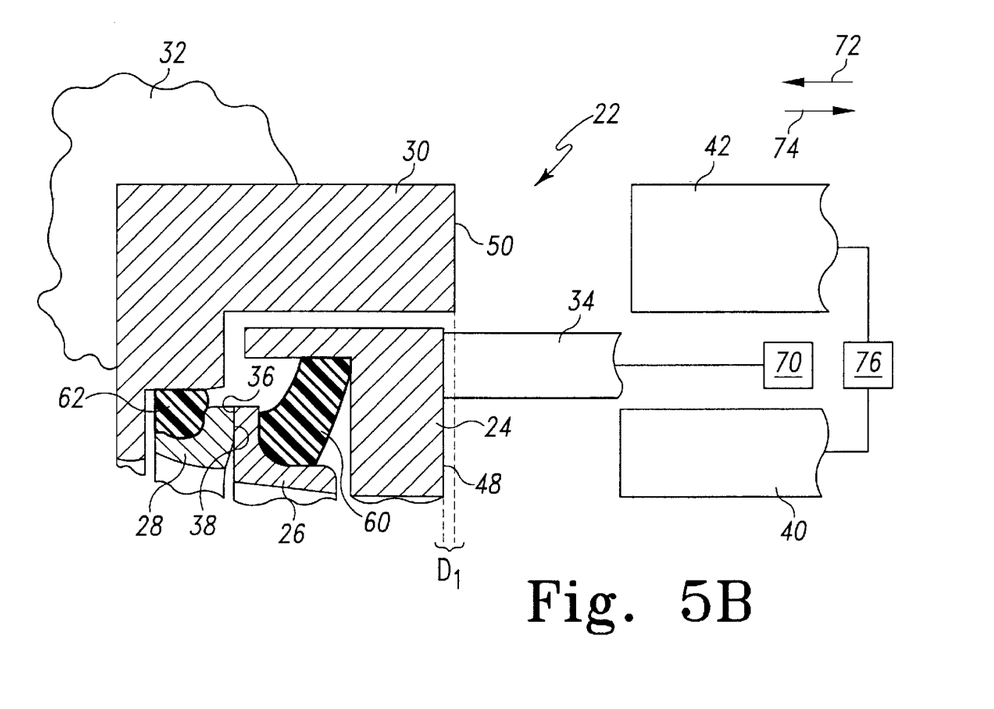
FIG. 5B is a view similar to FIG. 5A but showing the first ram in contact with the first support member.
Figure 5C:
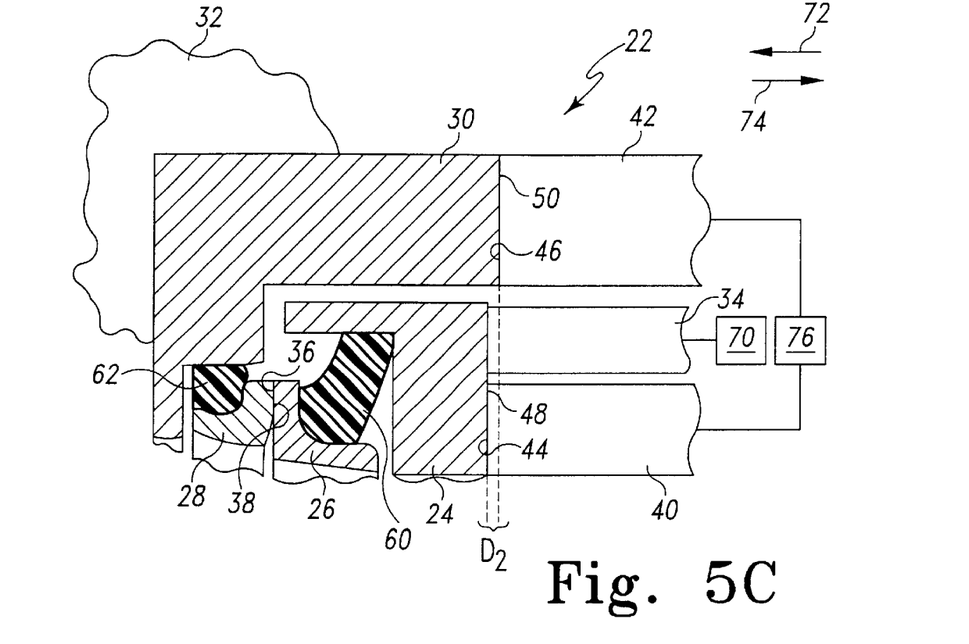
FIG. 5C is a view similar to FIG. 5B but showing the second ram in contact with the first support member and the third ram in contact with the second support member.
Figure 5D:
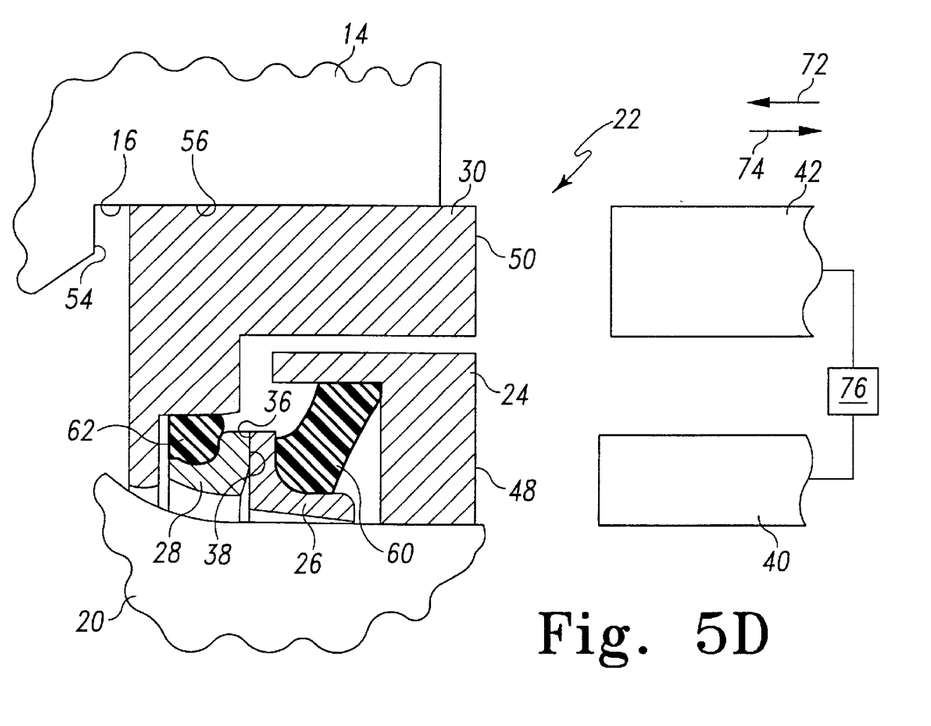
FIG. 5D is a fragmentary view of the first support member, the first seal member, the second seal member, and the second support member of the roller assembly of FIG. 1 positioned in a receptacle of a rim of the roller assembly of FIG. 1 with the second ram and the third ram positioned adjacent thereto.

As shown in FIG. 5B, ram 34 is advanced in the direction indicated by arrow 72 until ram 34 contacts wall segment 48 of support member 24. Ram 34 is moved further in the direction indicated by arrow 72 so as to move support member 24 relative to support member 30. Note that support member 30 remains stationary while support member 24 is being moved as a result of support member 30 being positioned in fixture 32. Moving support member 24 in the direction indicated by arrow 72 causes seal member 26 to be urged against seal member 28 such that a load is produced between seal face 36 and seal face 38. The aforementioned load produced between seal face 36 and seal face 38 is measured as discussed above. When the load produced between seal face 36 and seal face 38 substantially equals a predetermined load value, support member 24 has moved relative to support member 30 a distance $D_1$. As shown in FIG. 5C, once the load produced between seal face 36 and seal face 38 substantially equals the predetermined load value and support member 24 has moved relative to support member 30 the distance $D_1$, rams 40 and 42 are moved in the direction indicated by arrow 72 such that (i) ram 40 is positioned in contact with wall segment 48 of support member 24 and (ii) ram 42 is located in contact with wall segment 50 of support member 30. The relative position of rams 40 and 42 is then fixed such that rams 40 and 42 are unable to move relative to one another. Fixing the relative position between ram 40 and ram 42 results in an end 44 of ram 40 being spaced apart from an end 46 of ram 42 by a distance $D_2$ which is substantially equal to distance $D_1$.

After fixing the relative position of rams 40 and 42, the components of seal assembly 22 are removed from fixture 32. The components of seal assembly 22 are then (i) disposed around shaft 20 and (ii) positioned within receptacle 16 as shown in FIG. 5D. In particular, the components of seal assembly 22 are positioned within receptacle 16 such that (i) load member 60 is interposed and in contact with support member 24 and seal member 26, (ii) seal face 36 of seal member 26 is in contact with seal face 38 of seal member 28, (iii) load member 62 is interposed and in contact with support member 30 and seal member 28, and (iv) seal member 26 and seal member 28 are both interposed support member 24 and support member 30. Note that the components of seal assembly 22 are positioned within receptacle 16 so that support member 30 is spaced apart from annular end wall surface 54. Fixed rams 40 and 42 are positioned in an opposing relationship with wall segment 48 of support member 24 and wall segment 50 of support member 30, respectively.

Figure 5E:
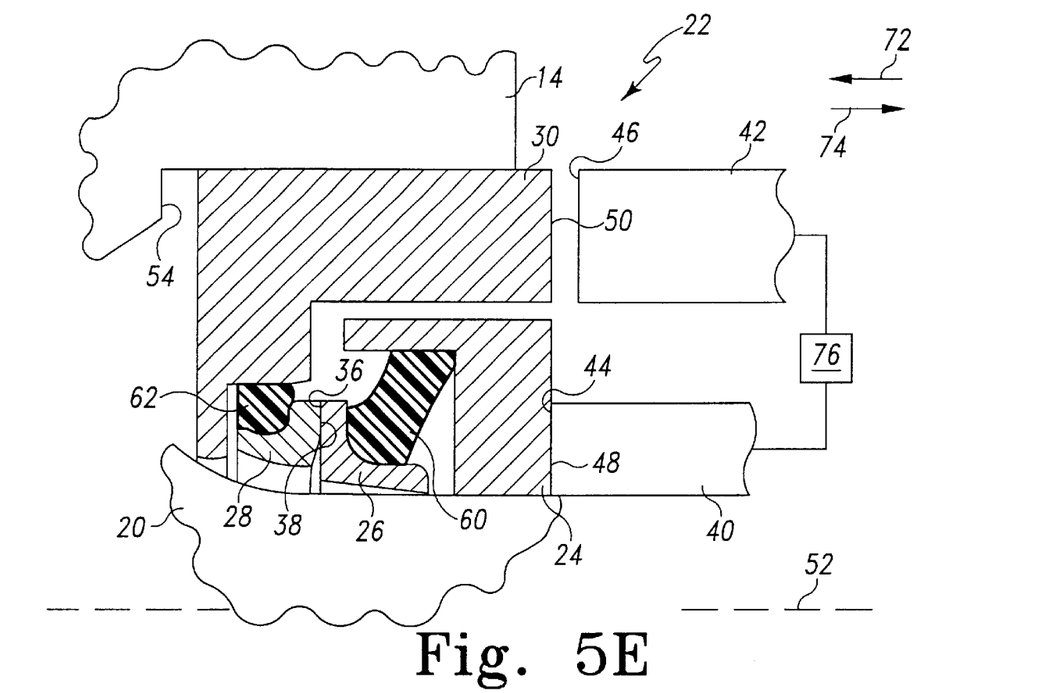
FIG. 5E is a view similar to FIG. 5D but showing the second ram in contact with the first support member.
Figure 5F:
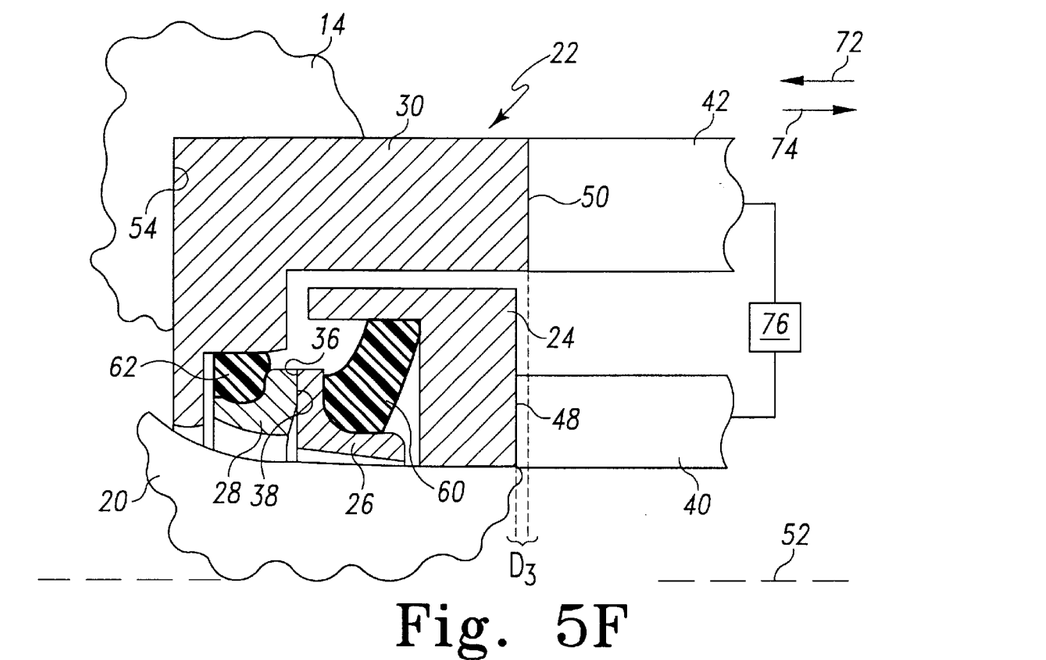
FIG. 5F is a view similar to FIG. 5E but showing the second ram in contact with the first support member and the third ram in contact with the second support member.

As illustrated in FIGS. 5E and 5F, mechanism 76 advances fixed rams 40 and 42 along longitudinal axis 52 of shaft 20 so that (i) ram 40 contacts wall segment 48 of support member 24, (ii) ram 42 contacts wall segment 50 of support member 30, and (iii) ram 40 moves support member 24 relative to support member 30 a distance $D_3$. It should be appreciated that since the relative position of ram 40 and ram 42 was fixed such that end 44 of ram 40 is spaced apart from end 46 of ram 42 by distance $D_2$ (see FIG. 5C), and $D_2$ is substantially equal to distance $D_1$ (see FIG. 5B), then distance $D_3$ is substantially equal to distance $D_1$ and distance $D_2$. Fixed rams 40 and 42 continue to move support members 24 and 30 in the direction indicated by arrow 72 along longitudinal axis 52 of shaft 20 until (i) support member 30 contacts annular end wall surface 54, (ii) support member 24 is press fit onto shaft 20 such that support member 24 is unable to move relative to shaft 20, and (iii) support member 30 is press fit into receptacle 16 such that support member 30 is unable to move relative to rim 14. Once support member 24 is press fit onto shaft 20 and support member 30 is press fit relative to rim 14, fixed rams 40 and 42 are moved in the direction indicated by arrow 74 thereby completing the formation of seal assembly 22.

It should be understood that press fitting support member 24 onto shaft 20 and support member 30 relative to rim 14 in the above described manner with fixed rams 40 and 42 results in the relative position between support members 24 and 30 on shaft 20 (i.e. support member 24 is moved relative to support member 30 the distance $D_3$) being substantially the same as the relative position between support members 24 and 30 in fixture 32 (i.e. support member 24 is moved relative to support member 30 the distance $D_1$, and distance $D_3$ substantially equals distance $D_1$). Moreover, it should be appreciated that having the relative position of support members 24 and 30 substantially the same when these components are positioned in fixture 32 as when these components are disposed around shaft 20 and located in receptacle 16 results in the load between seal face 36 and seal face 38 when seal members 26 and 28 are located in receptacle 16 being substantially the same as the measured predetermined load value attained with ram 34 when seal members 26 and 28 were located in fixture 32. As this load has a magnitude such that, as previously discussed, substantially prevents debris from entering passageway 18 while allowing seal face 36 and seal face 38 to slide past one another without generating excessive amounts of heat.

Figure 6:
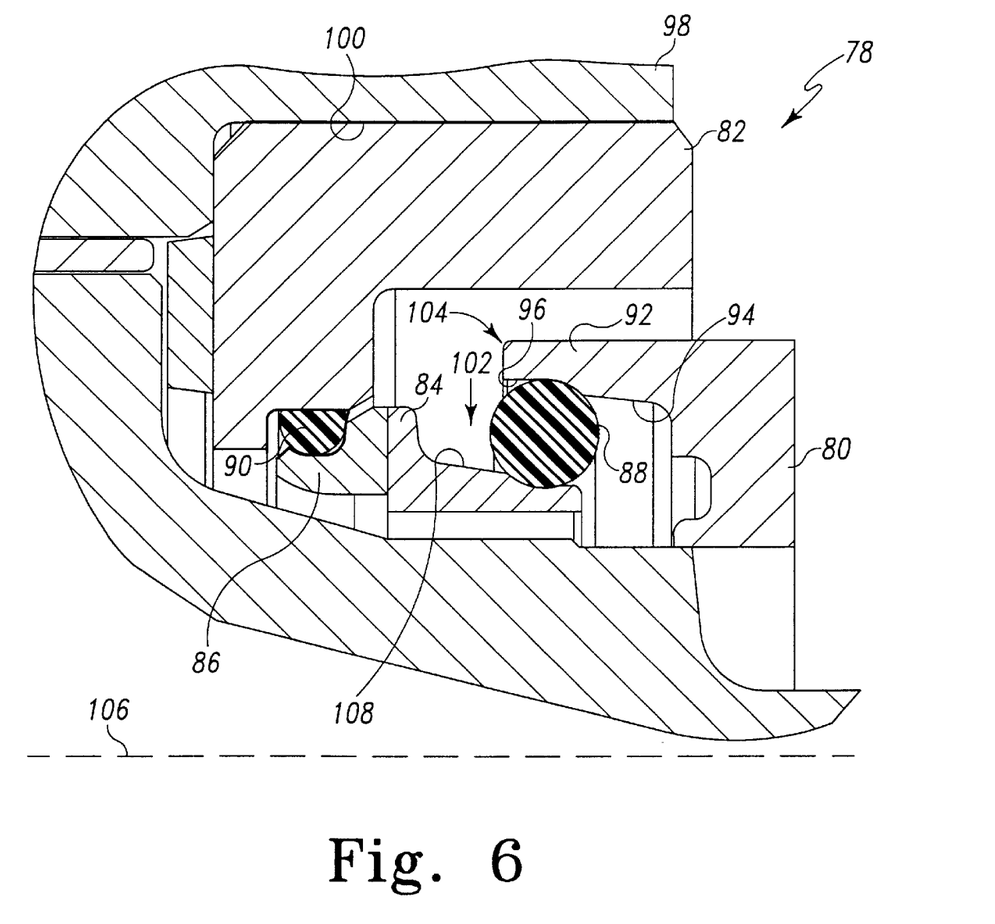
FIG. 6 is an enlarged cross sectional view of a seal assembly which can be used in the roller assembly of FIG. 1.

Now referring to FIG. 6, there is shown a seal assembly 78 which can be used in the present invention. Seal assembly 78 is similar to seal assembly 22. In particular, seal assembly 78 also includes a support member 80, a support member 82, a load member 88, a seal member 84, a seal member 86, and a load member 90. Seal assembly 78 is positioned in a receptacle 100 of a rim 98 in substantially the same manner as described above for seal assembly 22.

Seal member 84 includes a mounting ramp 108. Mounting ramp 108 has an annular notch 97 defined therein. Support member 80 includes a horizontally extending leg member 92. Leg member 92 has a circumferentially extending interior wall 94 which has an annular notch 96 defined therein. It should be appreciated that, in contrast to other support member configurations, leg member 92 does not have a lip portion extending from an end 104 thereof. In particular, leg member 92 does not have a lip portion extending from end 104 in the direction indicated by arrow 102. The absence of a lip extending from leg member 92 cooperates with annular notch 96 so as to increase the ease with which seal assembly 78 can be formed utilizing one of the above described methods. Specifically, the above described geometry of support member 80 functions to square load member 88 with seal axis 106 before load member 88 starts to roll up circumferentially extending wall 94 defined on support member 80. Annular notch 97 squares up load member 88 with seal axis 106 before load member 88 starts to roll up a mounting ramp 108.

INDUSTRIAL APPLICABILITY

It should be appreciated that the above discussed methods result in a measured predetermined load between seal face 36 and seal face 38 being attained rather than a load which is partially determined by the cumulative effect of the mechanical tolerances of the various components which make up the seal assembly. Therefore, utilizing the present invention allows the load between seal face 36 and seal face 38 to be controlled to a much greater degree as compared to other methods of forming a seal assembly. As such, the present invention ensures that the force utilized to urge seal members 26 and 28 together is great enough so that debris is prevented from entering the interior of the roller assembly. On the other hand, the present invention also ensures that the force utilized to urge seal members 26 and 28 together is not so great so as to increase the load therebetween to the point where too much heat is generated at the interface of seal members 26 and 28 as the roller assembly is utilized.

Other aspects and features of the present invention can be obtained from a study of the drawings, the disclosure, and the appended claims.

What is claimed is:

1. A method of forming a seal assembly around a shaft, said seal assembly having a first support member, a first seal member having a first seal face, a second seal member having a second seal face, and a second support member, said method comprising:

(a) positioning said first support member, said first seal member, said second seal member, and said second support member in a fixture such that said first seal member and said second seal member are interposed said first support member and said second support member;

(b) positioning a first ram in contact with said first support member;

(c) moving said first support member a distance $D_1$ relative to said second support member so as to cause said first seal member to be urged against said second seal member such that a load is produced between said first seal face and said second seal face;

(d) locating (i) a second ram in contact with said first support member and (ii) a third ram in contact with said second support member;

(e) fixing the relative position between said second ram and said third ram such that an end of said second ram is spaced apart from an end of said third ram by a distance $D_2$ which is substantially equal to said distance $D_1$;

(f) positioning said first support member, said first seal member, said second seal member, and said second support member relative to said shaft so that (i) said first support member, said first seal member, said second seal member, and said second support member are disposed around said shaft and (ii) said first seal member and said second seal member are interposed said first support member and said second support member;

(g) placing said fixed second and third rams relative to said shaft, said first support member, and said second support member so that (i) said second ram is in an opposing relationship with a wall segment of said first support member and (ii) said third ram is in an opposing relationship with a wall segment of said second support member; and (h) advancing said fixed second and third rams along a longitudinal axis of said shaft so that (i) said third ram contacts said wall segment of said second support member, (ii) said second ram contacts said wall segment of said first support member, and (iii) said second ram moves said first support member relative to said second support member a distance $D_3$, wherein said distance $D_3$ is substantially equal to said distance $D_1$ and said distance $D_2$.

2. The method of claim 1, wherein:

(c) includes measuring said load produced between said first seal face and said second seal face, and (d) occurs when said load produced between said first seal face and said second seal face substantially equals a predetermined load value.

3. The method of claim 1, wherein:

(f) includes locating said first support member, said first seal member, said second seal member, and said second support member within a receptacle defined by a first wall surface connected to a second wall surface, and (h) includes moving said second support member along said longitudinal axis of said shaft until said second support member contacts said first wall surface.

4. The method of claim 1, wherein:

(f) includes locating said first support member, said first seal member, said second seal member, and said second support member within a receptacle defined in a rim of a roller assembly, said receptacle defined by an annular end wall surface connected to a circumferentially extending wall surface, and (h) includes moving said second support member along said longitudinal axis of said shaft until said second support member contacts said end wall surface.

5. The method of claim 4, wherein:

(f) further includes placing said rim in contact with a track link.

6. The method of claim 3, wherein:

(f) further includes positioning (i) a first load member between said first seal member and said first support member and (ii) a second load member between said second seal member and said second support member.

7. A method of manufacturing a work machine which includes a roller assembly having (i) a rim with a receptacle and a passageway defined therein and (ii) a shaft positioned within said passageway, said method comprising:

(a) positioning a first support member, a first seal member, a second seal member, and a second support member in a fixture such that said first seal member and said second seal member are interposed said first support member and said second support member;

(b) positioning a first ram in contact with said first support member;

(c) moving said first support member a distance $D_1$ relative to said second support member with said first ram so as to cause said first seal member to be urged against said second seal member such that a load is produced between a first seal face defined on said first seal member and a second seal face defined on said second seal member;

(d) locating (i) a second ram in contact with said first support member and (ii) a third ram in contact with said second support member;

(e) fixing the relative position between said second ram and said third ram such that an end of said second ram is spaced apart from an end of said third ram by a distance $D_2$ which is substantially equal to said distance $D_1$;

(f) positioning said first support member, said first seal member, said second seal member, and said second support member relative to said shaft so that (i) said first support member, said first seal member, said second seal member, and said second support member are disposed around said shaft and located within said receptacle and (ii) said first seal member and said second seal member are interposed said first support member and said second support member;

(g) placing said fixed second and third rams relative to said first support member, and said second support member so that (i) said second ram is in an opposing relationship with a wall segment of said first support member and (ii) said third ram is in an opposing relationship with a wall segment of said second support member; and (h) advancing said fixed second and third rams along a longitudinal axis of said shaft so that (i) said third ram contacts said wall segment of said second support member, (ii) said second ram contacts said wall segment of said first support member, and (iii) said second ram moves said first support member relative to said second support member a distance $D_3$, wherein said distance $D_3$ is substantially equal to said distance $D_1$ and said distance $D_2$.

8. The method of claim 7, wherein:

(c) includes measuring said load produced between said first seal face and said second seal face, and (d) occurs when said load produced between said first seal face and said second seal face substantially equals a predetermined load value.

9. The method of claim 7, wherein:

said receptacle is defined by an annular end wall surface connected to a circumferentially extending wall surface, and (h) includes moving said second support member along said longitudinal axis of said shaft until said second support member contacts said end wall surface.

10. The method of claim 9, wherein:

(f) further includes placing said rim in contact with a track link.

11. The method of claim 9, wherein:

(f) further includes positioning (i) a first load member between said first seal member and said first support member and (ii) a second load member between said second seal member and said second support member.

12. A method of forming a seal assembly around a shaft, comprising the steps of:

positioning a first support member, a first seal member, a first load member, a second seal member, a second load member and a second support member about the shaft;

positioning a ram m contact with the second support member;

moving the ram in two directions along the axis of the shaft;

moving the second support member, and thus the second seal member, in response to movement of the ram;

producing loads between the first and second seal faces as results of moving the second seal member;

measuring the loads between the first and second seal members while the ram is urging the second support member in one of the directions;

attaining a predetermined load value from the loads;

securing the second support member to the shaft to fix the relative position between the first and second seal members at said predetermined load value, said predetermined load value being of a magnitude great enough to prevent entry of debris and less than great enough to cause excessive heat at the interface of the first and second seal faces; and removing the ram from contact with the second support member after securing the second support member to the shaft.

13. The method of claim 12 wherein the step of securing the second support member to the shaft includes welding the second support member to the shaft.

14. A method of claim 12 wherein the step of measuring the loads include determining the loads in direct proportion to forces utilized to move the ram against the second seal member.

15. The method of claim 12 wherein:

the step of positioning the second support member about the shaft includes fitting a ring member of the second support member on the shaft so that it is unable to move relative to the shaft and disposing another ring member of the second support member about the first ring member; and the step of securing the second support member to the shaft includes securing the another ring member relative to the shaft.

16. The method of claim 15 wherein the step of moving the second support member includes moving the another ring member relative to the first ring member and the shaft.

* * * * *

UNITED STATES PATENT AND TRADEMARK OFFICE
CERTIFICATE OF CORRECTION

PATENT NO.     : 6,568,684 B2
DATED          : May 27, 2003
INVENTOR(S)    : Billy R. Bedford and Timothy M. Waters It is certified that error appears in the above-identified patent and that said Letters Patent is hereby corrected as shown below:

<u>Column 11,</u>
Line 29, after "ram" delete "m" and insert -- in --

Signed and Sealed this

Second Day of September, 2003

JAMES E. ROGAN
*Director of the United States Patent and Trademark Office*